March 7, 1939. D. J. NELSON 2,150,125
GAS AND LIQUID PUMPING AND SEPARATING APPARATUS
Filed Dec. 17, 1936
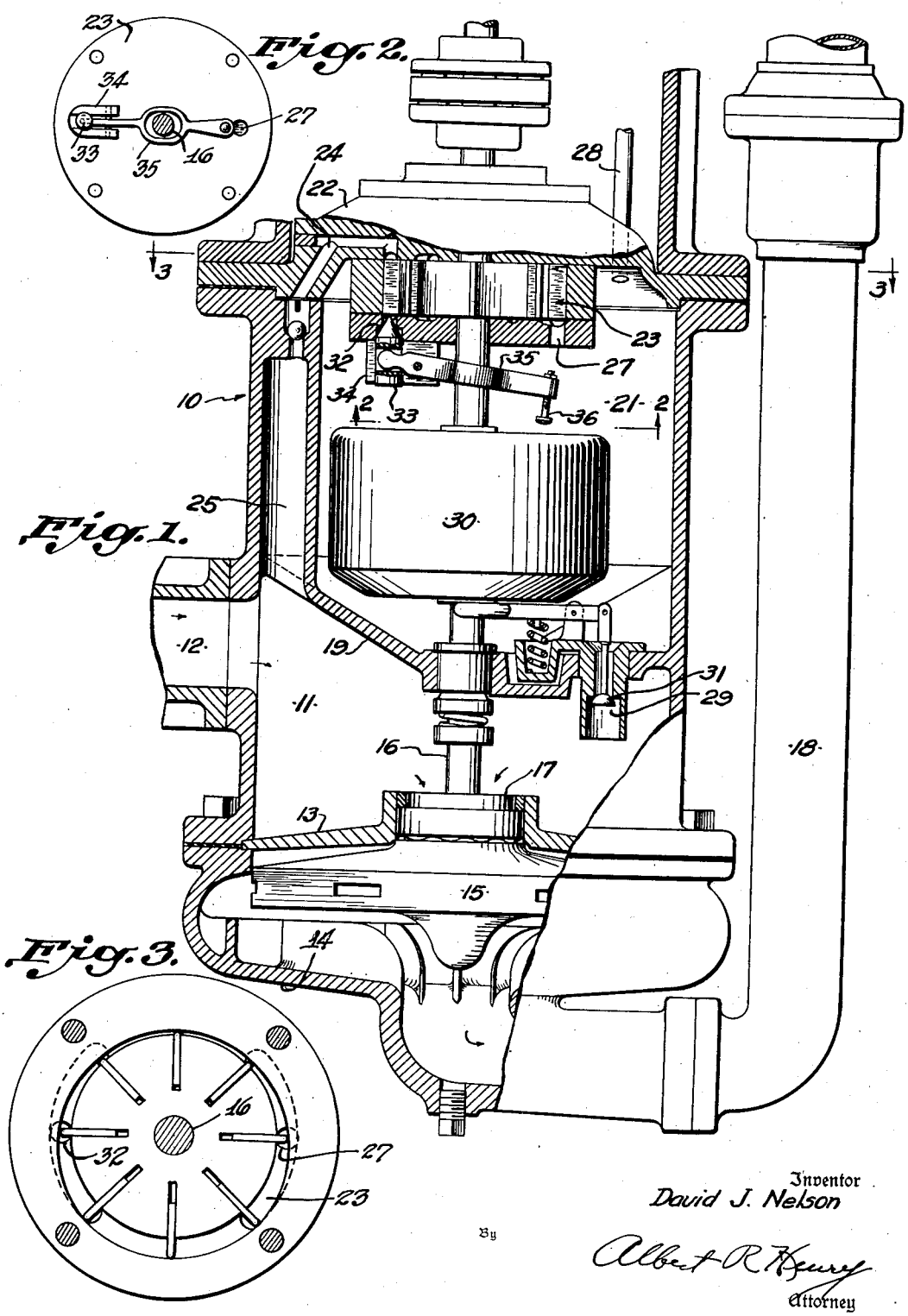
Inventor
David J. Nelson
By Albert R. Henry
Attorney Patented Mar. 7, 1939

2,150,125

UNITED STATES PATENT OFFICE 2,150,125

GAS AND LIQUID PUMPING AND SEPARATING APPARATUS

David J. Nelson, Buffalo, N. Y., assignor to Martin & Schwartz, Inc., Buffalo, N. Y.

Application December 17, 1936, Serial No. 116,366

2 Claims. (Cl. 103—113)

This invention relates to the pumping of liquids, particularly volatile liquids such as gasoline, with the concurrent separation of air and other incondensible gases therefrom, and it deals particularly with the maintenance of a high operating efficiency, in apparatus intended for this purpose, irrespective of variations in climatic or other uncontrollable conditions.

In the pumping of gasoline, it has heretofore been proposed to employ a main liquid pump and a gas pump, so organized with each other that the liquid and entrapped air may be separated with the independent exhaustion of the air from the system. Such units have heretofore been made and used with satisfactory results in most instances,—the relative capacities of the gas and liquid pumps being so proportioned that proper pumping and separation usually could be effected.

The general efficiency of such a unit may be materially impaired, however, when the apparatus is subjected to extreme temperature conditions. This is because gasoline is a volatile liquid, and, under the high temperatures obtaining in mid-summer, an undue percentage of gasoline vapor is formed, thus overtaxing the capacity of the gas pump and proportionately diminishing or impairing the delivery of air-free liquid. While gasoline vapors entering the gas pump may be recompressed therein, such vapors not only displace air, which should be removed, but are recondensed at the expense of additional work. On the other hand, if the gas pump be given a capacity sufficiently great to take care of adventitious air and the vapor bodies formed at high temperatures, then such pump has an excessive capacity during the winter months, or when no air is present, which again leads to operating inefficiencies and a tendency toward flooding of the unit with gasoline.

It will thus be understood that, due to the nature of the medium to be pumped, and the existence of uncontrollable conditions, situations may arise which destroy the efficiency of apparatus properly designed for normal operating conditions. The present invention, however, presents a solution of the problem thus presented, by taking a unit satisfactory for severe service conditions, and providing it with means for modifying the capacity or effectiveness of the gas pump in response to the variations of extreme climatic or other operating conditions affecting the formation or introduction of large gas bodies in the system.

More specifically, the present invention proceeds on the premises that, whenever air is in the system, it should be evacuated as quickly as possible by means of an efficient gas pump, but the gas pump should not be permitted to function effectively merely to volatilize gasoline into condensible vapors. As noted above, there is such a tendency in an efficient gas pump, which becomes more pronounced the higher the temperature or the lighter the constituents of the gasoline. In providing for satisfactory operation under these varying conditions of temperature, volatility, and relative proportions of incondensible and condensible gas in the system, the effectiveness of the gas pump, according to this invention, is therefore made primarily dependent upon the presence or absence of incondensible gas, such as air, in the separating components of the system. When there is much air, and relatively little wet gasoline or condensible vapor, to be presented to the gas pump, its capacity and efficiency are high. When there is little or no air, although a wet atmosphere present, the effectiveness of the gas pump is intentionally diminished.

In order to modify the gas pump effectiveness in response to the quality of the gas body in the system, there may be provided a main inlet path and a secondary inlet path to the gas pump, either by providing the pump with two or more separate inlet ports, or branching the connection to a single inlet port to give the effect of a dual inlet. If the discharge side of the gas pump be connected to one, or the other, of the inlets, then the pump will be short circuited, and accordingly will lose its effectiveness in proportion to the diminution of suction on or extent of closure of the other port. Accordingly, the present invention provides for the partial or complete short circuiting of the gas pump, to take effect when the need for evacuating incondensibles is not present.

As the apparatus will provide its own signals of the presence or absence of incondensible and condensible gases, which are displayed at various parts of the system, and since the variation of effectiveness may be accomplished by specifically different ways of opening, closing, or connecting the various pump ports, it will be apparent that the principles of the invention may be utilized in practice in numerous ways. For example, since gasoline vapors are condensed in the gas pump, and the presence of liquid in the gas pump is indicative of air-free liquid pumping or excessive volatilization, any liquid discharging from the gas pump can be employed to establish such port connections as will serve to reduce the effectiveness of the gas pump, and thus prevent further induction of gasoline.

A typical embodiment of the invention is illustrated in the accompanying drawing, wherein:

Fig. 1 is a vertical section through a typical apparatus, showing one way of controlling the gas pump;

Fig. 2 is a fragmentary section on the line 2—2 of Fig. 1;

Fig. 3 is a section on the line 3—3 of Fig. 1, showing the displacement pump and the port arrangement thereof.

The pumping and air separating apparatus shown in Figs. 1 to 3 will be recognized as similar to that described in detail in U. S. Letters Patent No. 1,981,965, and therefore a summary description of like parts will suffice here. The unit comprises a housing 10 having a chamber 11 which is in fluid communication with the main inlet from the liquid reservoir through a pipe connection 12. Connected to the lower end of the housing 10 is a two part pump casing 13, 14, in which is disposed a centrifugal pump impeller 15. The impeller is suspended from and rotatable with a vertical shaft 16 extending through the upper end of the housing 10 for connection with a motor, not shown, and liquid entering the chamber 11 enters the eye of the impeller through an orifice 17 formed in the casing member 13. Liquid passing through the impeller is discharged into the pipe 18 (which may contain a check valve) for conveyance, for example, to the liquid meter, sight glass, and hose of a gasoline dispensing unit.

Disposed above the chamber 11 in the housing 10, but separated therefrom by a wall 19, is a second chamber 21, closed at its upper end with a cap member 22. A positive displacement pump 23, which serves as a priming and gas evacuating pump, is mounted on the shaft 16 at the upper part of the chamber 21, so that, upon operation of the centrifugal pump 15, the gas pump is also operated. An inlet passage for the gas pump is provided through a duct 24 disposed in the cap member 22 which is in communication with a duct 25 formed in the housing 10 by an upward extension of the wall 19. It will thus be seen that upon operating the pumps in unison, a suction is created on the pipe 12 to evacuate chamber 11 through the gas pump 23, thus permitting liquid containing adventitious air to enter the chamber 11 for delivery of the liquid to the centrifugal pump, and delivery of separating air to the gas pump. Once primed with liquid, of course, the centrifugal pump will continue to provide its own suction.

The discharge port 27 of the gas pump communicates with the chamber 21, which is in fluid communication with the atmosphere through a vent 28 formed in the upper portion of the housing 10. Air inducted into the gas pump 23 through the inlet 25 is thus discharged into the chamber 21, and may flow to waste through the vent pipe. Gasoline vapors or liquid entering the gas pump 23 are discharged into the lower portion of the chamber 21, because the gas pump exerts a compressing and condensing action on the vapors. The lower portion of the chamber 21 is formed with a drain opening 29 normally closed by a valve 31, which is operable by means of a float 30 disposed in the chamber 21, and freely slidable along the shaft 16.

Whenever an appreciable quantity of liquid collects in the chamber 21, the float 30 will lift, thus opening valve 31, and permitting the condensed gasoline to drain back into the chamber 11 for delivery to the inlet of the centrifugal pump 15.

In the normal or usual operation of the apparatus, mixed air and liquid bodies enter the lower chamber 11, and a main separation of the air occurs therein, with the liquid going to the centrifugal, and the air, with more or less gasoline vapor or liquid particles entrapped therein, going to the gas pump 23 through the duct 25. A secondary separation takes place upon the discharge of the incondensible air and condensed gasoline into the chamber 21, the air flowing out the vent 28, and the reclaimed liquid returning to the centrifugal through the opening 29 after lifting the float 30. As long as, or whenever, significant quantities of air are drawn into the apparatus with the liquid, such normal operation is desirable to effect proper separation. Thus, at the outset of operation, the fluid in the pipe 12 and chamber 11 is mostly air, which must be evacuated, since a centrifugal pump cannot pass air, and if it did pass air, then incorrect metering would result. During running operation, a large globule of air may suddenly enter the pipe 12, and, unless it were removed, it would block admission of liquid to the centrifugal pump. This air must also be evacuated if efficient and satisfactory operation is to be maintained.

However, after the air is evacuated, it will be understood that continued operation of the gas pump 23 to develop a suction pressure through the duct 25 tends to pump gasoline from the chamber 11, through the chamber 21, and back into the chamber 11, thus setting up a cycle of work which is unnecessary, and therefore represents wasted energy. Moreover, the suction head developed through the duct 25 permits the gasoline to boil at a lower temperature, and even if liquid gasoline is not drawn up through the duct 25, gasoline vapors will be. In hot summer weather, thus suction pressure, coupled with the volatility of the gasoline, might set up such a condition that excessive amounts of gasoline "flash" into gas in the chamber 11, and it then becomes very difficult to prime the pump 15, and procure satisfactory operation or liquid delivery. It will thus be seen that the composition of the gas in the system, in terms of percentages of air, entrapped liquid particles, and condensible vapors, and the ease of volatilization, all are variations which may be regarded as affecting the quality of the total gas body. Some of these conditions which are developed defeat the objects for which the apparatus is designed, and which it will attain under other and more favorable conditions.

To meet such varying conditions, the gas pump 23, according to the embodiment of the invention shown in Fig. 1, is provided with a second inlet passage or port 32, normally closed by a valve 33 which is mounted in a block 34 secured to the gas pump casing. A lever 35, pivoted to the block 34, is formed at one end with a head engaging a slot in the valve 33, while the opposite end of the lever extends around the shaft 16 to the opposite side of the chamber 21 and terminates in an adjustable pin 36. The parts are so proportioned that, when the float 30 rises, it strikes the pin 36, thus moving the lever to open the valve 33.

Upon such occurrence, the discharge port 27 of the gas pump 23 is directly connected to the inlet port 32, thus short circuiting the pump through the chamber 21, and thus breaking the suction head exerted through the passage 25. Under these conditions, the effectiveness of the gas pump to volatilize gasoline in the chamber 11 is materially diminished, and hence the flow of liquid or vaporized gasoline through the gas pump is prevented. This condition will occur as long as the valve 33 is opened, or as long as the float 30 is sufficiently elevated, and, by proper adjustment of the pin 36, and the orifice area of the drain 29, these relative times may be given any reasonable value desired.

In the event a large globule of air should suddenly enter the chamber 11 while the gas pump is short circuited, it will at once change the quality of the gaseous fluid in the chamber, by displacement of gasoline vapors, and by further displacement of the gases by liquid which may be draining through the opening 29. Thus, with a change in the quality of the gases in the apparatus, which would represent a condition under which the gas pump should be fully effective, the float 30 will drop, the port 32 will close, and the suction of the gas pump will again be exerted on the duct 25 to clear the system of air, and maintain the operation of the gas pump until the valve 33 is again operated. Whether, therefore, the conditions are such as to present incondensible air, or excessive quantities of highly volatile but condensible gasoline vapor, it will be seen that the effectiveness of the gas pump is made responsive to such conditions, thus preserving the function of the apparatus to pump liquid and eliminate air, without vapor binding at elevated temperatures.

I claim:

1. Gas and liquid pumping apparatus comprising a liquid pump, a separating chamber on the suction side of said pump, a second chamber adapted to communicate with the atmosphere, a gas pump disposed in said second chamber, said gas pump having a discharge port discharging into said second chamber, means connecting the suction side of the gas pump to the separating chamber, a connection between said chambers, a valve for closing said connection, means in said second chamber responsive to the presence of predetermined quantities of liquid therein for operating said valve, a second inlet for the gas pump communicating with said second chamber, a valve for said second inlet, and means operable by said liquid responsive means for operating said last named valve.

2. Gas and liquid pumping apparatus comprising a liquid pump, a separating chamber on the suction side of said pump, a second chamber adapted to communicate with the atmosphere, a gas pump formed with a discharge port, said port communicating with said second chamber, means connecting the suction side of said gas pump with said separating chamber, a connection between said chambers, a valve for closing said connection, a float disposed in said second chamber and operatively connected to said valve to open the connection between said chambers upon the occurrence in said second chamber of a predetermined quantity of liquid, a second inlet for the gas pump communicating with said second chamber, a valve for said second inlet, and means operable by the raising of said float to operate said valve and thereby open said second inlet.

DAVID J. NELSON.